UNITED STATES PATENT OFFICE

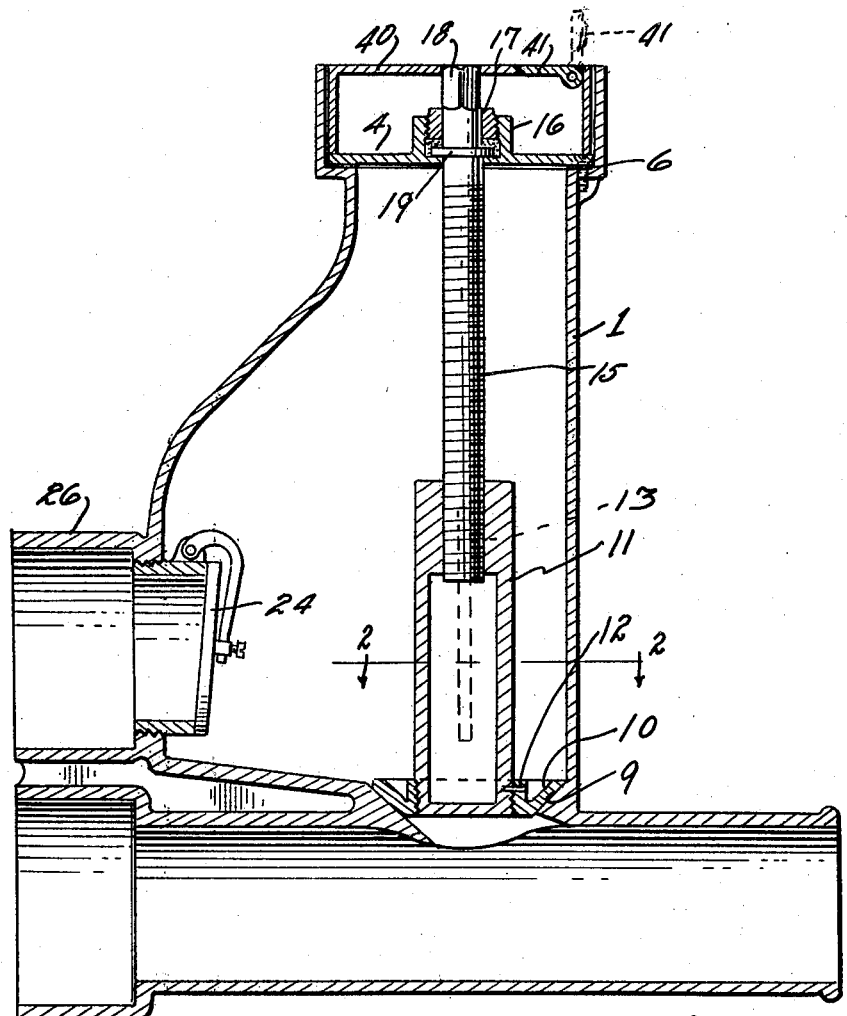
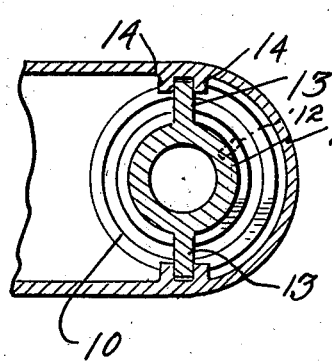

EDWARD W. N. BOOSEY, OF DETROIT, MICHIGAN

DRAINAGE FITTING AND VALVE CONSTRUCTION THEREFOR

Original application filed August 22, 1929, Serial No. 387,572. Divided and this application filed May 2, 1930. Serial No. 449,215.

This invention relates to valves, particularly adapted for use in drainage fittings and is a division of my pending application for Letters Patent of the United States, Serial No. 387,572, filed August 22, 1929, now Patent 1,786,597 of December 30, 1930.

The purpose of the invention is to provide a valve movable toward or from its seat by means of a rotatable screw, the valve being held from rotation in its opening or closing movement.

A further object and feature of the invention is to provide a simple and inexpensively constructed valve and operating means therefor including a hollow casting to which the valve is detachably secured and relative to which the rotatable screw is in threaded relation and means for holding the casting from rotation.

A further feature and object of the invention resides in the provision with a drainage fitting of a valve operating means providing a cover for the fitting and an operating means for the valve.

These several objects and features of the construction of the invention are hereinafter more fully described and claimed, and a valve structure embodying my invention is shown in its preferred form in the accompanying drawing in which—

Fig. 1 shows my improved valve construction as utilized in conjunction with a drainage fitting.

Fig. 2 is a section taken on line 2—2 of Fig. 1 showing the manner of supporting the valve element from rotation while permitting longitudinal movement thereof toward or from its seat.

This valve may be adapted for use with several types of drainage fittings only one form of which is shown in Fig. 1 and in this fitting a casing 1 is provided having a hub 26 for an inlet conduit in which a swing check valve 24 and tubular element therefor is mounted to prevent back flow through the inlet conduit. The casing is provided with an outlet at the bottom having a seat 9 for a tapered valve 10. The valve is preferably of ring like form and may be secured to the supporting element 11 in any approved manner as by being threaded thereinto and a pin 12 inserted through the hub of the valve into the supporting casting 11 which is preferably closed at its bottom end as shown. The valve supporting element 11 is preferably formed of a hollow casting having a threaded aperture at the upper end to receive the threaded stem 15 by rotation of which the element 11 may be raised or lowered to open or close the valve relative to its seat 9. The operating stem 15 is preferably supported in a plate 4 resting on shoulders provided in the upper end of the casing and a packing element 6 is provided between the plate and the shoulder. The plate 4 has a hub 16 internally threaded to receive a packing nut 17 and the stem 15 extends through the packing element and has a squared end 18 for rotation thereof. The stem is further provided with a collar 19 within the hub 16 supported on the plate whereby the stem is held from longitudinal movement yet permitted to be rotated.

The preferred structure for rotating the stem consists of a cup-shaped element 40 positioned in inverted relation in the hub end 2 of the casing and flush with the upper surface thereof. An operating lever or hand-hold 41 is pivotally mounted in an aperture at one side of the stem formed in the upper face of the element 40. The lever 41 may be turned upwardly, as shown by dotted lines, to provide a handle by which the element 40 may be turned and the threaded stem 15 rotated to raise or lower the valve. To hold the valve from rotation, the casing is provided with the spaced lugs 14 on opposite sides as will be understood from Fig. 2 providing recesses between the lugs on each side in which radial wings 13 formed on the element 11 are positioned and movable in a vertical direction in the construction here shown or longitudinally of the stem.

By the arrangement of the parts described, a drainage fitting and valve arrangement is provided that is simple in construction and the operating element provides a cover member for the upper end of the drainage fitting which is usually flush with the floor surface.

It will be evident from the foregoing description that the various objects of the invention are attained by the construction described.

Having thus briefly described my invention, what I claim and desire to secure by Letters Patent of the United States is—

1. In a drainage fitting, a chambered casing having an inlet adapted for connection with a drain and an outlet therefor, a manually operable valve controlling the outlet, said casing at its upper end having a hub the upper end of which terminates practically flush with a floor surface, a rotatable stem for operating the valve, a plate seating in the hub in sealed relation therewith and through which the stem extends, means for sealing the interstice between the stem and the plate, said plate and sealing means providing a mounting for the stem preventing longitudinal movement thereof, said stem terminating in a squared end extending to practically flush with the hub, and an operating means for the stem comprising an inverted cup-shaped member, the lower open end of which rests upon the said plate with the upper end thereof practically flush with the hub and floor surface, said upper portion of the cupped member having a squared aperture fitting over the squared stem, and a handhold by means of which the cupped member and stem may be rotated.

2. In a drainage fitting including a chambered casing having an inlet and an outlet, a valve controlling the outlet, valve operating means including a rotatable stem extending upwardly to the top of the casing, said casing having an open end formed with a hub providing a shoulder below said end, a plate secured to the shoulder apertured to receive the valve operating stem, and operating means for the stem comprising an inverted cup-shaped member, the lower open end of which rests upon the plate, the said cup-shaped member engaging the end of the rotatable stem, and a handle element pivotally connected with the said cup-shaped member adjacent its periphery and turnable to non-operative position practically flush with the upper surface of the cup-shaped member and by means of which the stem and member may be rotated.

In testimony whereof I sign this specification.

EDWARD W. N. BOOSEY.